2,898,335
NITRATING AN N-(2-FURYL) ALKYLIDENE HYDRAZINE COMPOUND

Julian G. Michels, Norwich, N.Y., assignor to The Norwich Pharmacal Company, Norwich, N.Y., a corporation of New York No Drawing. Application February 28, 1958
Serial No. 718,154

7 Claims. (Cl. 260—240)

This invention relates to the preparation of nitrofurans and aims to provide a new process for nitrating an N-(2-furyl) alkylidine hydrazine compound to produce the corresponding 5-nitrofuran.

It is well known that N-(5-nitro-2-furyl) alkylidene hydrazine compounds, notably N-(5-nitro-2-furfurylidene) - 1 - aminohydantoin, N - (5 - nitro - 2 - furfurylidene) - 3 - amino - 2 - oxazolidone and 5 - nitro-2-furaldehyde semicarbazone, constitute valuable chemotherapeutic agents. In the past, those compounds have been prepared by condensing 5-nitro-2-furaldehyde, or a derivative thereof which is capable under the reaction conditions of producing 5-nitro-2-furaldehyde, with the appropriate hydrazine compound. 5-nitro-2-furaldehyde has been prepared through the nitration of furfural. This has entailed the use of acetic anhydride and has involved the formation of an intermediate which is converted into 5-nitro-2-furaldehyde by the addition of a base of other acid neutralizing material. That process is attended by serious disadvantages. Acetic anhydride is expensive and its use results in the production of waste products which present formidable disposal problems. Furthermore, the necessity for converting the nitration intermediate into 5-nitro-2-furaldehyde introduces a complication which is both expensive and time-consuming.

I have discovered that it is possible to dispense with the necessity for using acetic anhydride in the preparation of the nitrated furan hydrazine derivatives which are referred to above. This can be accomplished by causing furfural to react directly with the selected hydrazine compound and then nitrating the product of such reaction. Such nitration can be readily effected through the use of mixed acid, that is, a mixture of concentrated nitric and sulfuric acids. The fact that this can be done is surprising since attempts to nitrate furfural with mixed acid have been unsuccessful and this is believed to be due to the destruction of the furan nucleus. The reactants used in my process are inexpensive and readily available, and the necessity for converting a nitration intermediate into the desired end product is dispensed with.

In the practice of my invention a nitrofuran represented by the formula:

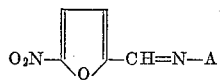

wherein A represents a member of the group consisting of ureido, 2,4-dioxo-1-imidazolidyl and 2-oxo-3-oxazolidyl is produced by the mixed acid nitration of a furan compound represented by the formula:

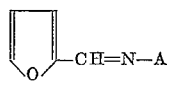

wherein A has the significance given above. Such furan compound may merely be dissolved or suspended in a substantially anhydrous menstruum, preferably concentrated sulfuric acid, and a mixture of concentrated nitric and concentrated sulfuric acids is added thereto. This addition is preferably effected under conditions such that the temperature of the reaction mixture is not permitted to exceed about 5° C. This can be effected by external cooling and by adding the mixed acid gradually. After all of the mixed acid has been added, the reaction mixture is quenched by pouring on ice and the resulting precipitate is filtered and washed with water until acid free. Further washing with organic solvents such as ethyl alcohol, ether, benzene or the like, which do not dissolve the nitrofuran thus obtained, may be carried out for further purification thereof. The end product is finally dried to remove any volatile residue.

In order that my invention may be fully available to those skilled in the art, the following specific examples thereof are described briefly:

Example I

To 75 cc. of concentrated sulfuric acid, which is cooled to 0–5° C., are added gradually 20.7 gm. of N-(furfurylidene)-1-aminohydantoin, prepared by reacting furfural with 1-aminohydantoin in the manner known to produce aldehyde hydrazine condensation products. To this mixture, held at −2 to −5° C., mixed acid, prepared by mixing 8.25 cc. of concentrated nitric and 16.5 cc. of concentrated sulfuric acids, is added with stirring over a period of 57 minutes. Upon completion of the mixed acid addition the mixture is poured on ice. The yellow solid which precipitates is filtered and washed acid free with water and then with ethyl alcohol and ether. It is dried at 110° C. There are obtained 17.5 gm. (71%) of N-(5-nitro-2-furfurylidene)-1-aminohydantoin.

Example II

To 100 cc. of concentrated sulfuric acid, cooled to 0–5° C., are added gradually 36.0 gm. of N-(furfurylidene-3-amino-2-oxazolidone, prepared by reacting furfural with 3-amino-2-oxazolidone in the manner known to produce aldehyde hydrazine condensation products. To the clear solution, held at −4 to 0° C., is added, over a period of 57 minutes, mixed acid which is prepared by mixing 13.4 cc. of concentrated nitric acid and 26.8 cc. of concentrated sulfuric acids. Upon completion of the mixed acid addition, the mixture is poured on ice. The yellow solid which precipitates is filtered and washed acid free with water and then with portions of ethyl alcohol and ether. It is dried at 65° C. There are obtained 37.1 gm. ((82.5%) of N-(5-nitro-2-furfurylidene)-3-amino-2-oxazolidone.

Example III

To 85 cc. of concentrated sulfuric acid, cooled to 0–5° C., are added 21.0 gm. of furaldehyde semicarbazone. To this mixture, held at −1 to −3° C., is added, with stirring over a time period of 40 minutes, mixed acid prepared by mixing 9.2 cc. of concentrated nitric and 18.4 cc. of concentrated sulfuric acids. Upon completion of the mixed acid addition, the mixture is poured on ice and the solid which precipitates is filtered. The filtered solid is washed acid free with water and then with portions of alcohol and ether. It is dried at 65° C. There are obtained 5.7 gm. (21%) of 5-nitro-2-furaldehyde semicarbazone. Recrystallization may be effected using dimethylsulfoxide as the solvent.

What I claim is:

1. The process of nitrating a hydrazine derivative of furan to produce an N-(5-nitro-2-furyl) alkylidene hydrazine compound, which comprises adding to a substantially anhydrous menstruum containing an N-(2-furyl) alkylidene hydrazine compound a mixture of concentrated nitric and sulfuric acids, and then precipitating said N-

(5-nitro-2-furyl) alkylidene hydrazine compound out of the reaction mixture.

2. The process of nitrating a furan compound represented by the formula:

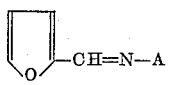

wherein A represents a member of the group consisting of ureido, 2,4-dioxo-1-imidazolidyl and 2-oxo-3-oxazolidyl to produce a nitrofuran represented by the formula:

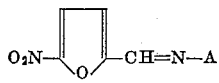

wherein A has the significance given above, which comprises adding to a substantially anhydrous menstruum containing said furan compound a mixture of concentrated nitric and sulfuric acids, and then precipitating said nitrofuran out of the reaction mixture.

3. The process of nitrating a furan compound represented by the formula:

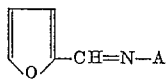

wherein A represents a member of the group consisting of ureido, 2,4-dioxo-1-imidazolidyl and 2-oxo-3-oxazolidyl to produce a nitrofuran represented by the formula:

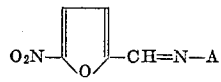

wherein A has the significance given above, which comprises adding to concentrated sulfuric acid containing said furan compound a mixture of concentrated nitric and sulfuric acids, and then precipitating said nitrofuran out of the reaction mixture.

4. The process of nitrating a furan compound represented by the formula:

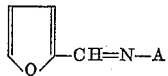

wherein A represents a member of the group consisting of ureido, 2,4-dioxo-1-imidazolidyl and 2-oxo-3-oxazolidyl to produce a nitrofuran represented by the formula:

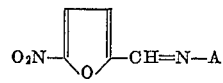

wherein A has the significance given above, which comprises adding to a substantially anhydrous menstruum containing said furan compound a mixture of concentrated nitric and sulfuric acids with cooling and at such rate that the temperature of the reaction mixture does not exceed about 5° C., and then precipitating said nitrofuran out of the reaction mixture.

5. The process of preparing N-(5-nitro-2-furfurylidene)-1-aminohydantoin, which comprises suspending N-(furfurylidene)-1-aminohydantoin in concentrated sulfuric acid, adding a mixture of concentrated nitric and sulfuric acids to said suspension, and then separating N-(5-nitro-2-furfurylidene)-1-aminohydantoin from the reaction mixture.

6. The process of preparing N-(5-nitro-2-furfurylidene)-3-amino-2-oxazolidone, which comprises dissolving N-(furfurylidene)-3-amino-2-oxazolidone in concentrated sulfuric acid, adding a mixture of concentrated nitric and sulfuric acids to said solution, and then separating N-(5-nitro - 2 - furfurylidene) - 3 - amino - 2 - oxazolidone from the reaction mixture.

7. The process of preparing 5-nitro-2-furaldehyde semicarbazone, which comprises dissolving furaldehyde semicarbazone in concentrated sulfuric acid, adding a mixture of concentrated nitric and sulfuric acids to said solution, and then separating 5-nitro-2-furaldehyde semicarbazone from the reaction mixture.

References Cited in the file of this patent

UNITED STATES PATENTS 2,484,481    Arthur _____ Oct. 11, 1949
2,652,402    Gever _____ Sept. 15, 1953

OTHER REFERENCES

Houben: Die Methoden der Org. Chem., 3rd ed., vol. 4, pp. 134–143; 180–210 (1940).